United States Patent Office 3,540,879
Patented Nov. 17, 1970

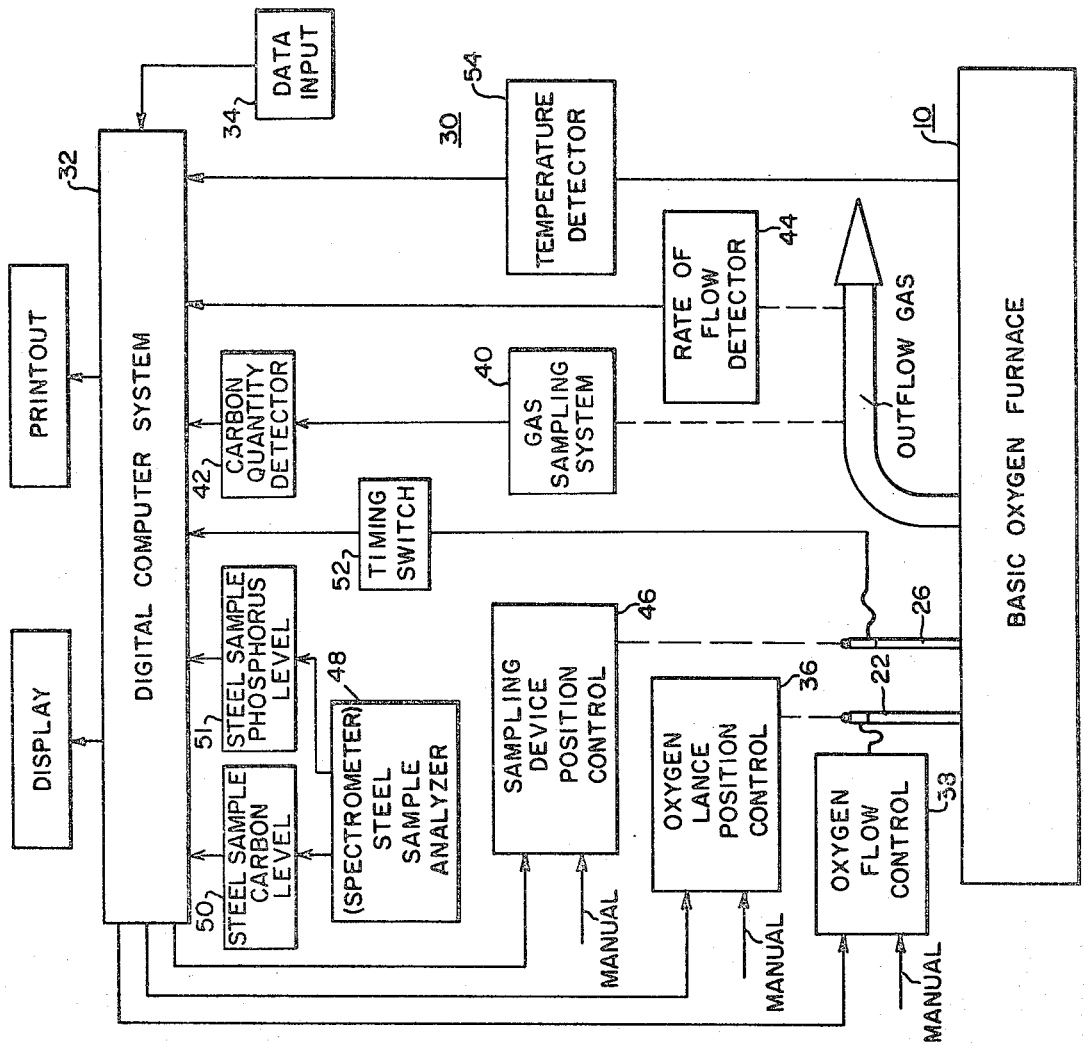
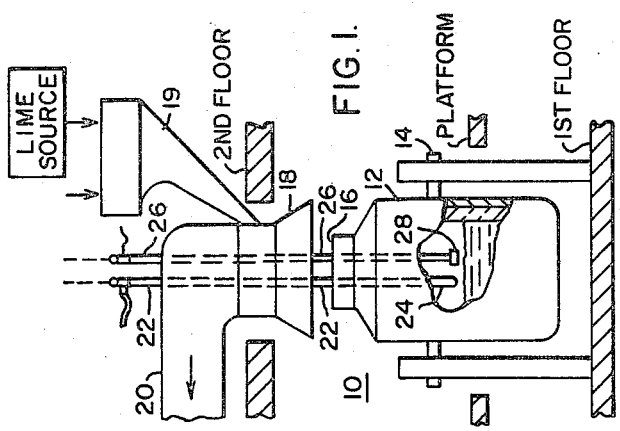
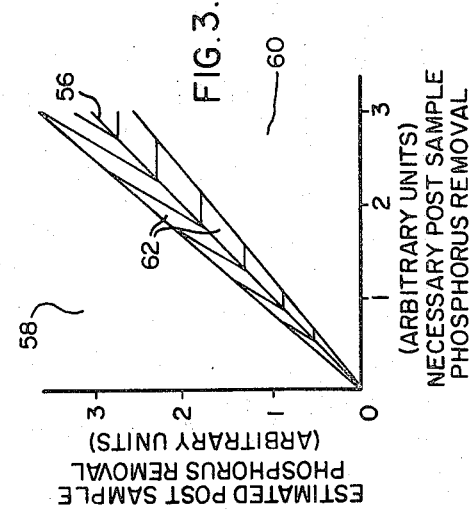

3,540,879
METHOD FOR CONTROLLING PHOSPHORUS REMOVAL IN A BASIC OXYGEN FURNACE
Norman R. Carlson, Export, Pa., assignor to Westinghouse Electric Corporation, Pittsburgh, Pa., a corporation of Pennsylvania
Filed June 27, 1967, Ser. No. 649,231
Int. Cl. C21c 5/32
U.S. Cl. 75—60                                     10 Claims

ABSTRACT OF THE DISCLOSURE

Phosphorus control is achieved in low and high carbon basic oxygen furnace heats on the basis of direct metal sampling during the oxygen blow. Dephosphorizing corrective action is applied after the sampling and prior to vessel turndown if such action is required to reach a phosphorus level equal to or less than the maximum allowable process endpoint level. The phosphorus control is made compatible with carbon, temperature and other endpoint controls.

CROSS-REFERENCE TO RELATED APPLICATIONS

The following copending applications assigned to the present assignee are referenced:

(1) Ser. No. 649,235 entitled "A Direct Sampler Adapted for Use in a Steelmaking Basic Oxygen Furnace," and filed by N. R. Carlson, J. T. Carleton and R. E. J. Putman on June 27, 1967.

(2) Ser. No. 649,236 entitled "Improved System and Method for Controlling Carbon Removal in a Basic Oxygen Furnace," and filed by N. R. Carlson, J. T. Carleton and R. E. J. Putman on June 27, 1967.

BACKGROUND OF THE INVENTION

In the basic oxygen steelmaking process, a lance is controllably positioned to feed a controlled amount of oxygen into the basic oxygen vessel principally for the purpose of heating and decarburizing the metal bath to a specified endpoint temperature and carbon level. Dephosphorization of the bath metal also occurs during the bath processing principally by an oxidation reaction which moves phosphorus from the bath metal into the slag.

Excessive residual phosphorus causes brittleness or otherwise adversely affects the required properties of most steel products, and it is therefore ordinarily necessary that the phosphorus in the bath metal be reduced to a predetermined level, usually about .02% or less. Phosphorus level in molten iron product from a blast furnace is measurable, and it would typically have a value of about .25%, but the phosphorus content of any scrap charged into the basic oxygen furnace would normally be unknown. Conventional basic oxygen furnace practice may or may not result in specified endpoint phosphorus level, and if the phosphorus level is at an uncorrectable high endpoint value the entire heat may have to be scrapped with substantial economic loss. By the term phosphorus level or carbon level, it is meant herein to refer to the weight percentage of the element in a quantity of steel. By the term phosphorus content or carbon content, it is meant herein to refer to the weight of the element in a quantity of steel. When the weight of a quantity of steel is known, the content of either element is readily determined from the level of that element and vice versa.

Since dephosphorization occurs simultaneously with decarburization in the basic oxygen furnace (BOF) process, some background is required on carbon endpoint control in order to establish a framework for understanding BOF phosphorus control. One means for effecting carbon endpoint control is that disclosed in U.S. Pat. No. 3,181,343, issued to J. D. Fillon on May 4, 1965. In the Fillon method, initial carbon content of the BOF charge is estimated and thereafter during the oxygen blow updated bath carbon content values are calculated by subtracting from the initial carbon estimate the total carbon removed from the steel bath as measured from the waste gases. When the updated bath carbon estimate corresponds to the specified endpoint level, the oxygen blow is terminated.

Another method which also involves making an initial carbon estimate is the oxygen balance method. A calculation is made of the total oxygen required to oxidize preestablished quantities of carbon, silicon, manganese, phosphorus and slag in the BOF charge. The oxygen blow is terminated when the blown oxygen equals the calculated value.

In both the Fillon and the oxygen balance methods, both high and low carbon heats can be produced. However, obtaining accurate endpoint carbon level is difficult because of the requirement for initial carbon estimating.

One recently developed BOF process improvement for low carbon heats involves an empirically determined dynamic relationship between the bath carbon removal rate and the bath carbon level. Generally, under controlled oxygen blow conditions, the carbon removal rate tends to be constant until the carbon level has dropped to or near a predetermined value such as about 45 points (.45% carbon). Carbon removal then decelerates, that is the carbon removal rate decreases. From the dynamic carbon rate-level relationship, bath carbon level is determined at some point in the process independently of the initial carbon estimate and endpoint carbon level within the low carbon range can accordingly be relatively accurately realized.

Further improvement is achieved in carbon control by the system and method disclosed in the above indicated copending carbon control application. In accordance with that disclosure, BOF steel can be produced with relatively accurate carbon endpoint control for both low and high carbon heats.

During decarburization in any of the foregoing controlled BOF processes, dephosphorization occurs to an extent dependent principally upon: (1) the slag basicity-phosphorus removal increases with increasing basicity; (2) FeO content in the slag-phosphorus removal varies inversely as the five halves power of the activity of slag FeO, and the FeO activity in turn is largely dependent on the amount of FeO in the slag; and (3) the amount of processing time. With conventional BOF practice for low carbon heats, phosphorus endpoint specifications are often met at the termination of the decarburizing oxygen blow since the slag FeO content time profile and decarburizing processing time are adequate in combination to result in lower than maximum allowed endpoint phosphorus level. In high carbon heats, however, endpoint phosphorus level often becomes problematical because of reduced slag FeO (for example, at 50 to 60 points carbon, slag FeO can be about one-half the value it is at about 10 to 20 points carbon) and because of reduced decarburizing processing time (for example, about five minutes less processing time is involved in reaching an endpoint carbon level of 100 points as opposed to 20 points from a common starting point carbon level). In both low and high carbon heats, the initial charge makeup can be varied to produce only limited and relatively uncertain phosphorus endpoint control. Further, in both low and high carbon heats, a high phosphorus content charge in the BOF vessel increases the probability of a high phosphorus endpoint level.

It is possible to make phosphorus correction after the process endpoint in either low or high carbon heats if phosphorus residuals are determined to be high by spectrographic analysis of a conventional spoon sampling obtained from the BOF vessel after it has been turned down following the oxygen blow. Corrective action is applied after the vessel has again been placed in the upright position. By the terminology process endpoint, it is herein intended to refer to a point in time just prior to vessel turndown.

Lime (CaO—a relatively strong base), iron ore, mill scale, or any combination of these can be added to the bath to aid in obtaining any required additional dephosphorization. Normally, a soft oxygen blow (raised lance and reduced oxygen flow) is initiated after the BOF vessel is uprighted for additional dephosphorization. The soft oxygen blow favors iron oxide buildup in the slag and minimizes the amount of additional decarburization and bath temperature change that occurs during further dephosphorization.

After the required or the maximum possible post process endpoint corrective action is completed, the bath may or may not be within phosphorus specifications and it is removed from the BOF vessel with no further dephosphorization then being possible. In any event, the requirement for post process endpoint phosphorus correction is undesirable since expensive furnace time is involved in the vessel turndown and reuprighting operation.

Moreover, if the BOF control has successfully produced target endpoint carbon and temperature values at the process endpoint, phosphorus correction after the process endpoint (i.e., after reuprighting of the vessel) will likely cause undesirable or unacceptable carbon and/or temperature changes even though such changes may be minimized as previously indicated. In turn, carbon and/or temperature correction is then required to the extent that it can be applied during or after phosphorus correction. Greater production efficiency can be realized if the carbon and temperature controls reflect anticipated phosphorus correction in the operation of the BOF prior to the process endpoint so as to bring the three bath variables on or adequately near target values at the process endpoint.

SUMMARY OF THE INVENTION

In accordance with the broad principles of the present invention, a BOF control system includes means for detecting the amount and rate of carbon removed from the BOF bath in the form of gaseous products during decarburizing oxygen blow. It preferably further includes means for computing bath carbon level and other process variables from the carbon removal and other input data. A direct sampler device is operated preferably during the decarburizing oxygen blow at an adequately early sampling time point to produce a sample for constituent analysis.

On the basis of the sampling time, sample phosphorus level data and sample carbon level data, the computing means makes predetermined calculations preferably to realize both improved phosphorus removal control and improved temperature and carbon removal control. The decarburizing blowing time to the specified carbon or carbon-temperature endpoint is predicted by calculation to provide a basis for estimating the amount of phosphorus that will be removed during the remaining decarburizing time period. If the calculated estimate of the endpoint phosphorus level is above a predetermined value, dephosphorizing corrective action is undertaken at a predetermined time after the sampling time and prior to vessel turndown. Preferably, the anticipation of such action is reflected in the carbon and/or temperature control operation thereby enabling specified endpoint phosphorus and, to the extent possible, other specified endpoint conditions to be reached at the process endpoint.

It is therefore an object of the invention to provide a novel method for controlling phosphorus removal in a BOF with improved efficiency and productivity.

Another object of the invention is to provide a novel and improved method for controlling phosphorus removal in low and/or high carbon heats processed in a BOF.

A further object of the invention is to provide a novel method for controlling phosphorus removal in a BOF so that phosphorus residual specifications can be met more reliably normally without requiring time consuming process endpoint bath sampling and correction procedures after vessel turndown.

An additional object of the invention is to provide a novel method for controlling phosphorus removal in a basic oxygen furnace so that specified phosphorus, carbon and temperature endpoint conditions can be compatibly met with improved reliability at the process endpoint.

These and other objects of the invention will become more apparent upon consideration of the following detailed description along with the attached drawings.

BRIEF DESCRIPTION OF THE DRAWINGS

FIG. 1 shows a basic oxygen furnace with an oxygen lance and a sampler device provided for operation in accordance with the principles of the invention;

FIG. 2 shows a BOF control system arranged in accordance with the principles of the invention; and FIG. 3 graphically shows the field of post sampling phosphorus removal possibilities and accordingly is useful in understanding the phosphorus correction decision making process.

DESCRIPTION OF THE PREFERRED EMBODIMENT

More specifically, there is shown in FIG. 1 a basic oxygen furnace 10 including a refractory lined vessel 12 which is trunnion supported for rotation from the illustrated vertical position to various inclined positions or the horizontal position about a reference axis 14. When the vessel 12 is to be charged at the startup of a heat, it is tilted to a predetermined extent and scrap metal scheduled for the heat is placed therein. Next, a preselected amount of molten iron is poured from a ladle through a mouth 16 of the vessel 12.

Considerations of thermochemical balance enter into choosing the ratio of scrap to molten metal to be used in charging the BOF 10. In a typical case, the total charge might be about 66% hot metal and 28% scrap. In this manner, conditions are established which enable the bath to be controlled more easily to reach the specified endpoint chemistry and endpoint temperature at the same time. Basic slag forming materials such as lime as well as other preselected materials are usually placed in the vessel 12 just after it has been uprighted and the oxygen has been started. Charge calculation duties would normally be assigned to the computer.

When the vessel 12 is charged and located in its upright position, it is disposed under a hood 18 which acts as a collecting agent for gases emitted from the interior of the vessel 12 during processing of the bath. A suitable clearance such as a foot or so is provided for vessel rotation relative to the hood 18. Collected gases are directed through ducting 20 or the like for eventual discharge to the atmosphere. Instrumentation for the outflow gases is approximately mounted in relation to the gas outflow path.

An oxygen lance 22, cooled by water or other coolant flow in a conventional lance coolant system, is disposed for vertical movement through the hood 18 so that the lance tip 24 can be disposed at various vertical positions within the vessel 12. A conventional cable hoist operated by a motor driven drum and a positioning control system (not indicated in FIG. 1) are provided for raising and lowering the oxygen lance 22.

Present BOF operating practice typically includes positioning the oxygen lance tip 24 about five feet or so above the quiescent slag surface during full blow conditions in order to produce a direct decarburizing oxygen supply at a predetermined rate (such as 25,000 cubic feet per minute per 350 tons of bath). Simultaneously, phosphorus and other elements such as silicon, manganese and sulfur are oxidized and removed by accumulation in the slag or by gas outflow. The total processing time from charging to the process endpoint typically would be about 25 minutes.

When a soft blow is to be effected for phosphorus correction or some other predetermined purpose, the oxygen flow is materially cut back and the lance tip 24 may be placed at the full blow position but it is usually raised to some higher position. For example, if it is desired to increase the amount of iron oxide in the slag, the oxygen flow would be cut back and the lance tip 24 would be placed at a predetermined soft blow position between the slag surface and the vessel mouth 16 where it creates a swirling oxygen atmosphere above the bath. The quantity of oxygen flow in any particular lance position is controlled as described in connection with FIG. 2.

In the full blow lance operation, direct decarburization occurs as already indicated. In soft blow or raised lance operation, decarburization can occur indirectly. In any case, the terminology decarburizing oxygen blow is herein intended to include the full blow and other blow operations in which direct carburization occurs. Indirect decarburizing blows such as slag building soft blows or slag building high lance-full flow blows are thus excluded from the definition.

There is also included in the BOF 10 a secondary lance or a direct sampler lance 26 which is operated through the hood 18 in accordance with the principles of the present invention by a cable hoist from a motor driven drum and a positioning control (not indicated in FIG. 1). A sampler tip 28 of the sampler lance 26 is controllably positioned at an appropriate location within the bath where an in process sample of the molten metal is obtained at a predetermined process time point and quickly withdrawn for analysis.

As indicated in the previously noted copending carbon control application, a bath carbon content or level determination can thus be directly made as opposed to the indirect determination made from analysis of the outflow gases through the hood 18. As disclosed in that application, the direct carbon determination provides a basis for accurate endpoint carbon control and maximized productivity.

In accordance with the present invention, a phosphorus level determination is made and a carbon level determination is preferably also made in the sample analysis. As a result, phosphorus control is applied without requiring a sampling after the process endpoint and vessel turndown. The system and method for phosphorus control are subsequently described more fully, and they are preferably provided compatibly and in combination with carbon endpoint and other controls placed on the BOF process.

To function as described, the sampler lance 26 must be operable to withstand a flaming atmosphere temperature of 3500° F. or more and immersion in molten slag and molten steel at about 2900° F. for a period as great as one-half minute or more. Operability requires that the sampler lance 26 be withdrawn intact and that a withdrawn sample contained in the sampler tip or device adequate for the purposes described is disclosed in the previously referenced BOF sampler copending application. Other suitable sampler lances and devices can also be employed if desired.

In FIG. 2, there is shown a control system 30 arranged to operate the BOF 10 with phosphorus control and carbon-temperature control in accordance with the principles of the invention. It includes a conventional digital computer system 32 which is provided with a programming system adapted to provide the data processing required for controlled operation of the BOF10. Suitable display and print out equipment is provided as indicated, and data input equipment 34 including for example a teletypewriter is provided for manual entry of data as required.

Prior to charging the BOF vessel 12, an estimate is made of the initial carbon content of at least the molten metal to be processed and the estimate is placed in the computer memory. Usual estimating calculation procedures are employed, including for example the taking of a sample of the molten iron, analyzing the iron sample for carbon level, determining the total weight of the molten iron, and computing the result from the sample and weight data. When a scrap estimate procedure is employed, the scrap carbon estimate is added to the molten iron carbon estimate.

After furnace charging, the oxygen lance 22 is lowered to its full blow position under the control of a position control 36. Start and stop oxygen lance operation and position setpoint control for the position control 36 are provided by the digital computer system 32, or these controls can be provided manually as indicated. An oxygen flow control 38 regulates the rate at which oxygen flows through the lance 22, and it is also controlled by the digital computer system 32, or if desired by manual operation as indicated.

When the oxygen lance 22 starts full blow decarburizing and dephosphorizing operation, the carbon integration is begun. Shortly thereafter, any additional charge materials are entered into the vessel 12 from a hopper 19. Limited control is placed on the endpoint phosphorus level by appropriate selection of the initial charge amount of slag forming material such as lime, but difficulties are encountered in reaching adequately low endpoint phosphorus levels from heat to heat of conventional BOF production because of the unknown amount of phosphorus contained in charged scrap and the like and because of the variability in the formation of BOF slag.

Without more effective phosphorus control, spoon sampling is conventionally required after the process endpoint and after vessel turndown in order to determine, among other things, the adequacy of dephosphorization. The results of the spoon sample analysis may require uprighting the vessel and adding lime and/or other materials and instituting a soft blow in order to achieve additional dephosphorization. In extreme cases, further phophorus correction may not be possible and the entire heat may have to be scrapped. The post process endpoint phosphorus correction procedure in any event adversely affects furnace efficiency and productivity as previously indicated.

In connection again with carbon control, a conventional gas sampling system 40 draws a sample flow from the outflow gas stream and a conventional carbon detector 42 operates on the sample flow to indicate continuously the instantaneous sample carbon level for entry into the computer system 32. Another conventional detector 44 employing a suitable stack mounted orifice plate or other means continuously determines the flow rate of the outflow gas for computer entry. The computer system 32 processes the sample carbon level and flow rate data to calculate the carbon integral with a suitable deduction made for aspirant air flowing into the hood 18. The programming system ordinarily would provide for the integration to be updated periodically, such as every five seconds.

Since the carbon integral equals the amount of carbon removed from the metal bath, subtraction of the carbon integral from the estimated initial carbon content provides an updated estimate of the bath carbon content. However, the time at which the updated estimate is determined occurs subsequently to the process time point to which the estimate applies. The time delay is due principally to the time involved in collecting, sampling and measuring the waste gases. Typically, the measurement time delay is about 40 seconds. Thus, a current estimate of the bath carbon content is obtained by subtracting from the updated estimate a predicted amount of carbon removed during a time period equal to the measurement time delay at the carbon removal rate characteristic of the time part of the process involved.

At a predetermined process time point, a steel sample is obtained from the bath by operation of the direct sampler layer 26. The sampler operation preferably occurs during the continuation of the full decarburizing oxygen blow operation of the oxygen lance 22. A sampler position control 46 is operated by the computer system 32 for start and stop functions and for the establishment of position setpoints. The position control 46 can also be operated manually as indicated.

As soon as the steel sample is obtained, it is withdrawn from the BOF vessel 12 by raising the sampler lance 26 through the hood 18. The sample is then placed in an analyzer 48 such as a spectrometer, and a carbon level analog signal and a phosphorus level analog signal are developed and entered into the computer as respectively indicated by the reference characters 50 and 51. With respect to carbon analysis, a Leco analyzer can be employed if desired for analysis of relatively high carbon levels. In other cases, the results of analysis may be visually determined and manually entered into the computer through the data input 34.

The point in time at which the bath sampling is made is adequately early in the decarburizing oxygen blow to allow time for analysis of the sample, processing of the sample results and initiation and completion of control actions which might be required before the process endpoint. Typically, the full oxygen blow is continuously maintained until the carbon endpoint is reached. Under continuous full blow operation about 90 carbon points are removed per five minutes when the bath carbon level is above about 45 carbon points. For the purpose of carbon endpoint control, as indicated in the previously noted copending carbon control application, the bath sampling time can thus be fixed to correspond to the point in time at which the estimated bath carbon content is about 90 points above the specified endpoint carbon content. For the purpose of phosphorus endpoint control or combined phosphorus and carbon endpoint control in accordance with the principles of the present invention, the bath sampling time can be and, where simplified programming is desired, preferably is fixed to correspond to the point in time at which the carbon content is a higher fixed number of points (such as 125 points) above the specified endpoint carbon level (i.e., about seven minutes before the carbon endpoint time).

Generally, however, there is an allowable time range during which the sample can be taken to provide timely results for phosphorus and/or carbon control, and the computer can therefore be programmed with a fixed sampling time as just indicated or it can be programmed in accordance with preselected constraints and rules which define the point in time at which the bath sample is drawn within the allowed time period. In any case, especially insofar as carbon endpoint control is concerned, the sample time point definition is preferably somewhat conservatively drafted thereby allowing for possible overestimation of initial carbon content.

If the oxygen flow rate or the oxygen lance position is varied for some control or other purpose during the decarburization of the bath by the lance 22, the decarburization and the dephosphorization processes are slowed down or interrupted. The computer can be programmed to take such effects into account automatically in defining the sampling time point.

At the instant the steel sample is drawn by the sampler lance 26, a timing switch 52 is operated to provide an accurate definition of the sampling time point for the computer. The switch 52 can be actuated by the closing of two contacts included in the sampler lance tip 28 as indicated in the aforementioned BOF sampler copending application.

The carbon integration is restarted at the sampling point, and, with the steel sample carbon level data entered into the computer, the bath carbon content is thereafter accurately determined for carbon control purposes by subtraction of the new carbon integral from the bath carbon content at the sampling time. For phosphorus control purposes, the amount of decarburizing blowing time between the sampling time and the point in time at which the endpoint carbon level will be reached is preferably predicted by use of data including carbon removal rate data and the bath carbon content at the sampling time point. With the steel sample phosphorus level data entered into the computer, the bath phosphorus content at the sampling time point is determined and the amount of additional necessary phosphorus removal is calculated with reference to the phosphorus endpoint specification.

The amount of phosphorus which will be removed by the end of the decarburizing oxygen blow is estimated from the predicted decarburizing blowing time and characteristic dephosphorization rate data. Such data typically would vary from BOF vessel to BOF vessel and can be obtained by analyzing a series of bath samples taken during each of a set of study heats in the particular BOF vessel in use. It is also possible that average dephosphorization rate data obtained for various BOF vessels can be successfully used for a particular BOF vessel.

Computer comparison is made between the estimated phosphorus removal and the calculated additional necessary phosphorus removal. In FIG. 3, a line 56 represents the sampling conditions under which the compared quantities are equal. If the estimated phosphorus removal exceeds the necessary phosphorus removal and the comparison point falls in region 58, no dephosphorizing corrective action is taken and carbon and temperature controls can be operated independently of phosphorus control considerations since it is reasonably certain that endpoint phosphorus level will be within the specification. If the necessary phosphorus removal exceeds the estimated phosphorus removal and the comparison point falls in region 60, dephosphorizing corrective action is required since it is reasonably certain that endpoint phosphorus level will be above the specification. Preferably, the operation of the temperature and carbon controls is then modified on the basis of the anticipated amount of phosphorus correction to the extent that such modification can be made for the purpose of steering the process to produce all specified endpoint conditions at the process endpoint.

Within a predetermined comparison region indicated by shaded area 62 on both sides of the equality line 56, there is represented a margin for instrumentation and other error. If the comparison point falls in the region 62, dephosphorizing corrective action may or may not actually be required, but dephosphorizing corrective action preferably is taken to assure acceptable endpoint phosphorus residuals.

When no dephosphorizing corrective action is required, the decarburizing oxygen blow is terminated when the calculated bath carbon content or level (including the allowance for measurement time delay) reaches the specified endpoint value and the heat is then readied for pouring. In most cases, the actual time at which the carbon endpoint is reached would be at least very close to the predicted carbon endpoint time and no reevaluation of the endpoint phosphorus level would be required. However, the estimated phosphorus level can be recalculated if a newly predicted or the actual carbon endpoint time is materially before the initially predicted carbon endpoint time. Any dephosphorizing corrective action indicated by the new calculation can then be taken. Similarly, if a newly predicted or the actual carbon endpoint time is materially after the initially predicted carbon endpoint time, any previous dephosphorizing corrective action decision not yet effected can be reevaluated and amended or cancelled in accordance with the results of the reevaluation.

Dephosphorizing corrective action is provided for example by adding lime to the vessel 12 and soft blowing with the oxygen lance 22 to encourage slag formation with minimum decarburizing and bath temperature change effect on the bath. The computer is programmed to determine the amount of dephosphorizing corrective action in direct relation to the difference between the estimated and necessary phosphorus removal quantities, preferably on the basis of empirical data derived from tests or actual production heats.

The dephosphorizing corrective action is taken after it has been specified and before the process endpoint, i.e., prior to a point in time just before vessel turndown. Preferably, the full or decarburizing oxygen blow is continued to the specified or a slightly higher carbon endpoint and the required dephosphorizing corrective action including soft blowing is taken thereafter. Under anticipatory control, the decarburizing blow is terminated as required at a computer determined carbon level higher than the specified level in order to allow for predictable further decarburization to the specified level on the basis of the computer specified amount of dephosphorizing corrective action.

With adequate process knowledge, dephosphorizing corrective action can be taken prior to the computer controlled termination of the decarburizing oxygen blow, the carbon, temperature and any other controls are then appropriately adjusted as by process operations including continuously variable oxygen lance position and oxygen flow control which are directed to reaching all specified endpoint conditions at the process endpoint.

Endpoint temperature control is made compatibly with the endpoint phosphorus and carbon controls described herein. For example, a detector 54 such as a device known in the trade as a bomb thermocouple can be dropped into the metal bath to produce a real temperature reading for computer entry at a process time point during the decarburizing oxygen blow corresponding to that at which the bath is about 27 carbon points above its specified endpoint carbon level. This point in time is selected since it allows ample time for insertion of coolant such as scrap if it is required prior to termination of the decarburizing oxygen blow for the purpose of producing specified bath temperature at the carbon endpoint if no phosphorus correction is anticipated.

However, anticipated dephosphorizing corrective action is reflected in the coolant calculation so that bath temperature will be at the specified value at the process endpoint.

The programmed computer calculates the expected bath temperature rise during the continuation of the decarburizing oxygen blow to the projected carbon endpoint time and during any soft blow directed to phosphorus correction. If the projected endpoint temperature is too high, a demand for coolant is signaled and scrap or other coolant is entered into the BOF vessel in the required amount.

If the projected endpoint temperature is too low, it is then necessary to provide decarburizing or soft oxygen blow beyond the carbon endpoint until the specified endpoint temperature is reached. If temperature control extension of decarburizing or soft oxygen blow is made, any previously specified dephosphorizing corrective action is modified accordingly. The heat can be accepted at the resulting carbon level after the temperature correcting blow and any required dephosphorizing corrective actions are completed, or partial or full carbon correction of a resulting low carbon heat can be made by introduction of carbocoke or the like into the molten metal when it is tapped into a ladle.

Any other required additives such as ferromanganese, aluminum or ferrophosphorus are also added at tapping. If a sampler lance 26 similar to that described in the aforementioned copending BOF sampler application is employed, the actual bath temperature reading to be used for predicting the endpoint temperature can be obtained by the sampler lance 26 at the bath sampling time point and the described bomb thermocouple procedure is eliminated.

By use of the control method of the invention, endpoint phosphorus specifications can be realized more reliably for low and high carbon BOF heats prior to process endpoint thereby effecting improved efficiency and productivity. Further, specified phosphorus endpoint level can be more reliably achieved compatibility with specified carbon and temperature endpoint levels at the process endpoint.

The foregoing description has been presented only to illustrate the principles of the invention. Accordingly, it is desired that the invention not be limited by the embodiment described, but, rather, that it be accorded an interpretation consistent with the scope and spirit of its broad principles.

I claim:

1. A method for controlling the operation of a basic oxygen furnace comprising the steps of obtaining a bath sample from the BOF vessel at a predetermined process time point prior to the process endpoint and during the time period covered by a decarburizing oxygen blow, analyzing the sample for its phosphorus level, operating a computer to calculate the bath phosphorus content at the sampling time point on the basis of the sample phosphorus analysis, operating the computer to calculate the necessary additional phosphorus removal required, operating the computer to predict the bath carbon endpoint time, operating the computer to estimate the amount of phosphorus removal from the sampling time point to the predicted bath carbon endpoint time without dephosphorizing corrective action, determining whether dephosphorizing corrective action is required, operating the vessel substantially to reach the bath carbon endpoint, and taking required dephosphorizing corrective action prior to vessel turndown.

2. A method for controlling the operation of a basic oxygen furnace as set forth in claim 1, wherein there are further included the steps of analyzing the bath sample for its carbon level, using the computer to calculate the bath carbon content at the sampling time point on the basis of the sample carbon analysis, using the computer to make a post sampling carbon removal calculation based on predetermined waste gas measurements and a starting time equal to the sampling time point, using the computer to calculate bath carbon content on the basis of the post sampling carbon removal calculation and the bath carbon content at the sampling time point, and using the computer to make the carbon endpoint prediction on the basis of the bath carbon content calculations.

3. A method for controlling the operation of a basic oxygen furnace as set forth in claim 2 wherein there are further included the steps of estimating the initial carbon content of at least the iron component of bath material with which the furnace is charged, using the computer to make a carbon removal calculation based on waste gas measurements during decarburizing oxygen blow operation prior to the sampling time point, using the computer to calculate estimated bath carbon content from the estimated intitial carbon content and the presampling carbon removal calculation, and determining the sampling time point on the basis of a predetermined relation between the estimated bath carbon content calculation and a specified endpoint carbon level.

4. A method for controlling the operation of a basic oxygen furnace as set forth in claim 3 wherein there are further included the steps of making a temperature reading of the bath at a predetermined process time point during the time period covered by the decarburizing oxygen blow, using the computer to calculate the predicted bath endpoint temperature on the basis of the temperature reading and the carbon content calculation and anticipated dephosphorizing corrective action, and taking any required temperature corrective action before the process endpoint.

5. A method for controlling the operation of a basic oxygen furnace as set forth in claim 2 wherein there are further included the steps of using the computer to add a predetermined number of carbon points to the specified points of the endpoint carbon level, and obtaining the bath sample when the estimated carbon content calculation reaches a value corresponding to the results of the immediately foregoing addition step.

6. A method for controlling the operation of a basic oxygen furnace as set forth in claim 1 wherein any required dephosphorizing corrective action is taken after termination of the decarburizing oxygen blow and wherein the estimate of phosphorus removal is made on the basis of a predetermined characteristic phosphorus removal rate.

7. A method for controlling the operation of a basic oxygen furnace as set forth in claim 1 wherein there is further included the step of using the computer to determine a carbon and temperature process endpoint which reflects the effect of anticipated dephosphorizing corrective action.

8. A method for controlling the operation of a basic oxygen furnace as set forth in claim 1 wherein dephosphorizing corrective action is determined to be required by the computer when the estimated phosphorus removal is greater than the sum of the necessary phosphorus removal plus a predetermined marginal amount of phosphorus removal.

9. A programmed method for operating a BOF digital computer system, said method comprising the computer operating steps of calculating the bath phosphorus content from the phosphorus level in a bath sample taken during the oxygen blow, calculating the necessary additional phosphorus removal required, predicting the bath carbon endpoint time, estimating the amount of phosphorus removal from the sampling time point to the predicted bath carbon endpoint time without dephosphorizing corrective action, and determining the amount of any required dephosphorizing corrective action.

10. A programmed BOF computer system operating method as set forth in claim 9 wherein there are further included the computer operating steps of calculating the bath carbon content at the sampling time point from the carbon level in the bath sample, calculating the post sampling carbon removal on the basis of predetermined waste gas measurements and a starting time equal to the sampling time point, calculating the bath carbon content on the basis of the post sampling carbon removal calculation and the bath carbon content at the sampling time point, and predicting the carbon endpoint on the basis of the bath carbon content calculation.

References Cited

UNITED STATES PATENTS

| | | | |
|---|---|---|---|
| 3,076,703 | 2/1963 | Metz | 75—52 |
| 3,161,499 | 12/1964 | Percy | 75—60 |
| 3,172,756 | 3/1965 | Bengtsson | 75—60 |
| 3,181,343 | 5/1965 | Fillon | 73—23 |
| 3,236,630 | 2/1966 | Stephan | 75—60 |
| 3,329,495 | 7/1967 | Ohta et al. | 75—60 |
| 3,372,023 | 3/1968 | Krainer et al. | 75—60 |
| 3,423,202 | 1/1969 | Ledunne et al. | 75—52 |

FOREIGN PATENTS 989,993  4/1965  Great Britain.

OTHER REFERENCES

Philbrook et al., Basic Open Hearth Steelmaking, AIME, 1951, pages 309–313.

L. DEWAYNE RUTLEDGE, Primary Examiner

G. K. WHITE, Assistant Examiner

U.S. Cl. X.R.

235—151.1